Oct. 27, 1931.  L. BRUEHL  1,829,501

EVAPORATOR FOR REFRIGERATING APPARATUS

Filed Jan. 23, 1928  3 Sheets-Sheet 1

INVENTOR
Lawrence Bruehl
BY
Dean Fairbank Obreght & Hirsch
ATTORNEY

Patented Oct. 27, 1931

1,829,501

UNITED STATES PATENT OFFICE

LAWRENCE BRUEHL, OF BROOKLYN, NEW YORK, ASSIGNOR TO GAS REFRIGERATION CORPORATION, OF SCRANTON, PENNSYLVANIA, A CORPORATION OF DELAWARE

EVAPORATOR FOR REFRIGERATING APPARATUS

Application filed January 23, 1928. Serial No. 248,660.

Although evaporators embodying certain of the novel features of the present invention may be used in various different forms of containers and for cooling various fluids, the preferred form embodying all of the important novel features of my invention is intended for use in a household refrigerator for cooling air therein and for forming a small quantity of ice which may be removed for table use.

One object of the invention is to secure efficient regulated cooling of the air and a controlled circulation thereof. A further object is to regulate and limit the rate of heat absorption by the refrigerant. A further object is to prevent the absorption of food odors by the water being frozen to form ice.

As one important feature the vessel containing the main body of liquefied refrigerant is mounted out of the path of the main current of air circulating in the refrigerator so that it absorbs the minimum amount of heat. This vessel is provided with a branch in the path of the air whereby only a limited amount of the refrigerant is used at any one time for cooling purposes.

As another feature this branch of the main refrigerant container is provided with heat absorbing fins so positioned that they guide the air in its thermocyclic flow and promote such flow by the absorption of heat therefrom.

As a further feature this branch and its fins are mounted in a compartment through which the flow of air may be controlled by dampers or other draft regulators.

As a further feature the branch of the main refrigerant container is so designed as to insure the proper feed of liquefied refrigerant thereto, the escape of gas therefrom, and the drainage to a sump of any non-volatile or high boiling point constituent, such as water, which may have been driven over to the evaporator from the boiler during the heating period, if the apparatus be of the intermittently acting absorption type.

As a further feature the main refrigerant container is provided with a second branch similar to or corresponding in some respects to the air cooling branch, but disposed in a separate compartment. This branch may provide the refrigerating effect required for freezing water in trays or other containers in the compartment.

As a further feature the last mentioned compartment is so designed and positioned that air normally does not circulate therethrough and thus any odors from the food in the refrigerator will not reach the water. Also the placing of any hot article in the refrigerator and the temporary raising of the temperature of the air will not interfere with the continued freezing action on the water.

As a further feature the main or outside casing is provided with means whereby the opening of said casing for removal of ice does not permit escape of cold air from the main food chamber.

As a further feature the main chamber of the refrigerant receiver has a simple and improved means for effecting the return from the evaporator at the beginning of the absorption period, of a small quantity of liquid from the lowermost part thereof and containing any water or other absorbent liquid which may have come over during the preceding heating period.

Other objects and important features of the invention will be pointed out hereinafter or will be apparent from a consideration of the accompanying drawings and the following description of one embodiment of the invention.

Figure 1:
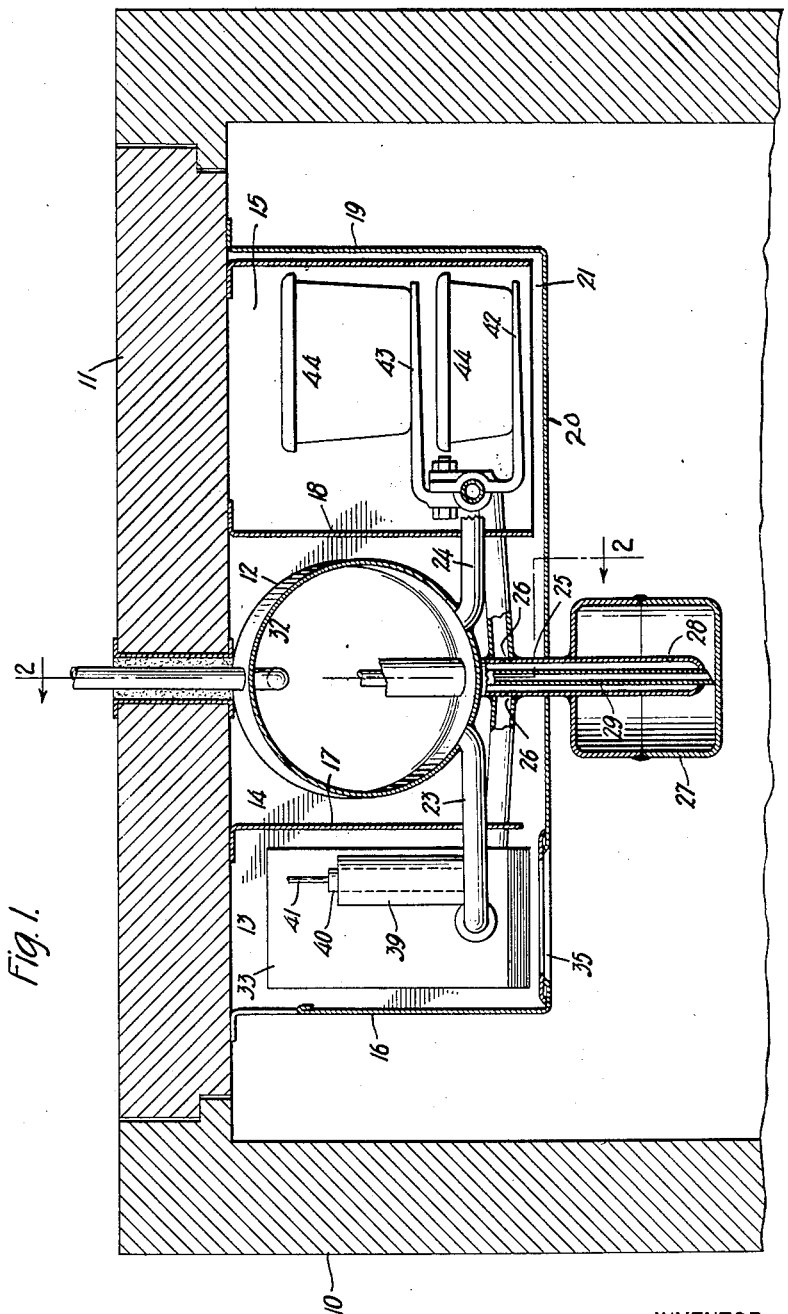
Fig. 1 is a vertical section through the upper part of a refrigerating chamber and the improved evaporator therein.
Figure 2:
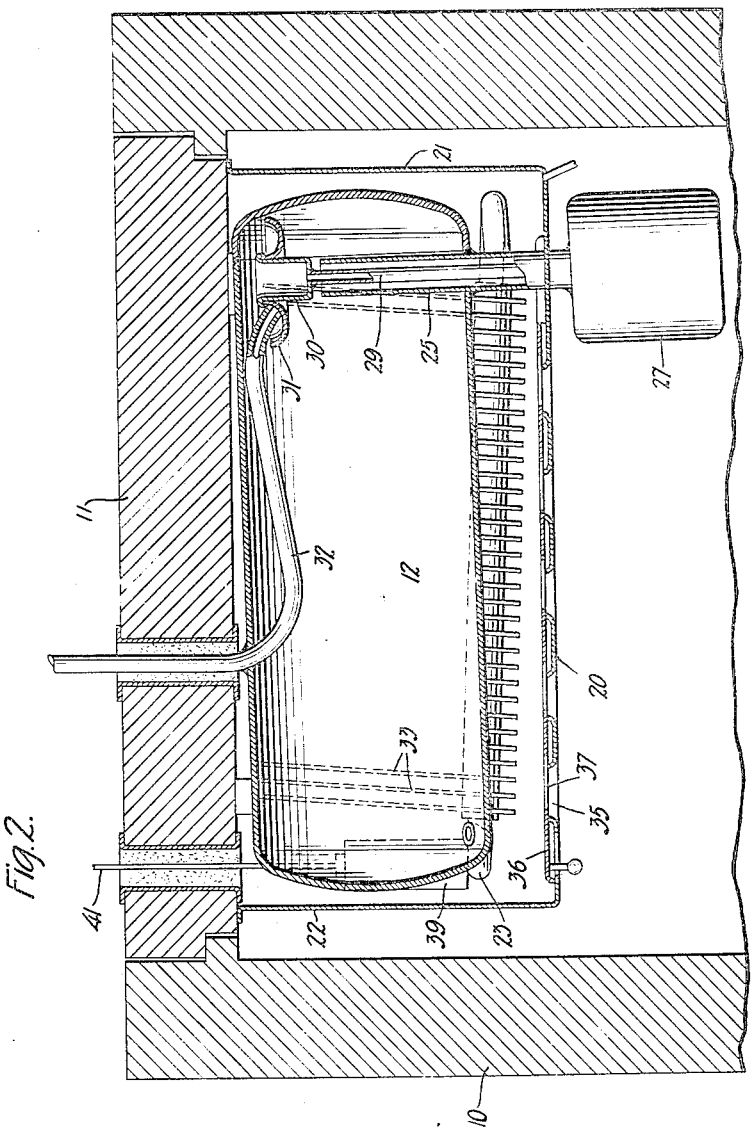
Fig. 2 is a vertical section on the line 2—2 of Fig. 1.
Figure 3:
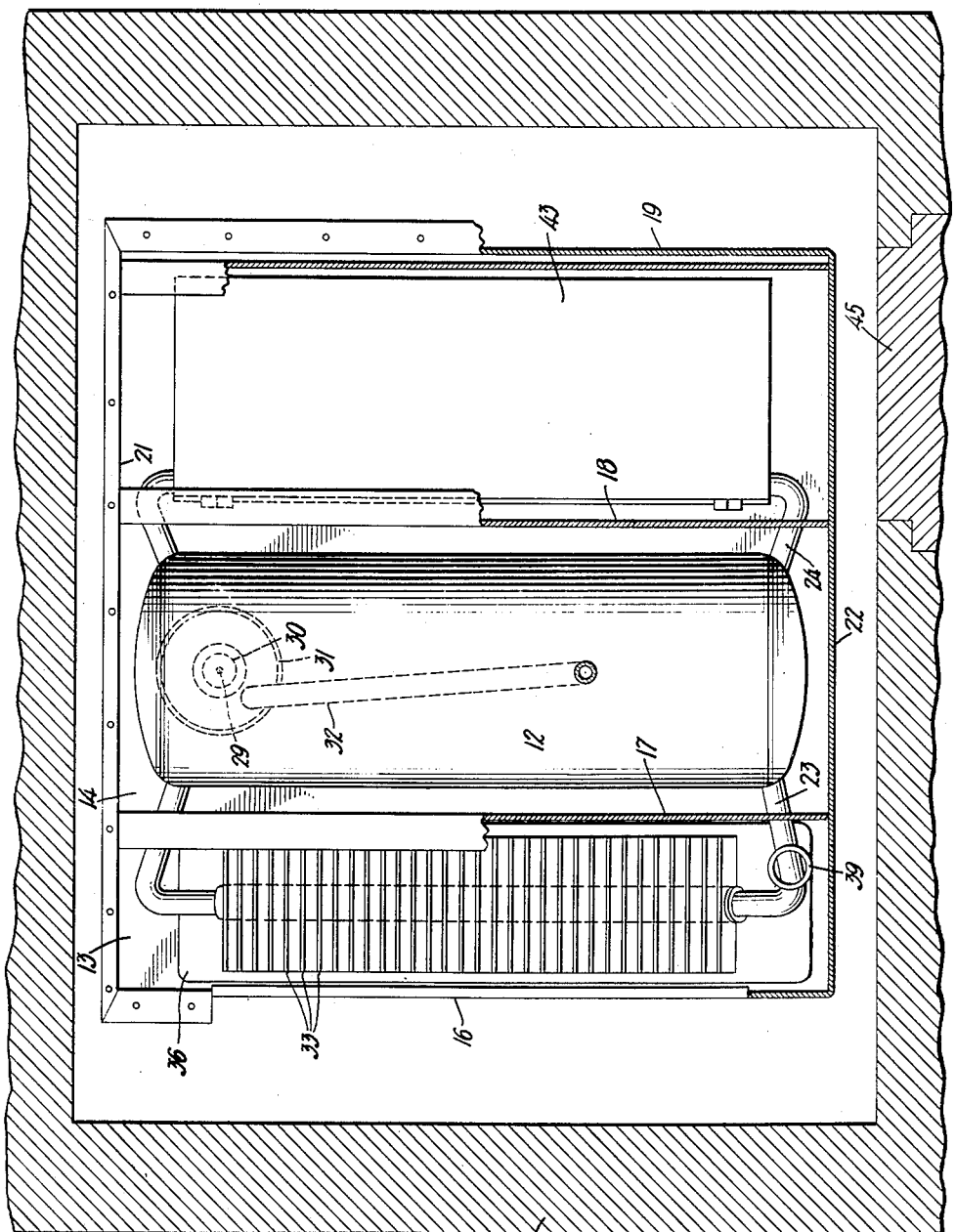
Fig. 3 is a top plan view of the evaporator, the outside casing and a portion of the evaporator being in section.

In the construction illustrated the evaporator is mounted in the upper part of a main casing 10 which may be of any suitable design of construction and preferably of insulating material of sufficient thickness to adequately prevent heat losses. The evaporator is secured to or suspended from the top wall 11 which is preferably removable from the remainder of the main casing so that for purposes of shipment and storage the top wall 11 may be removed with the evaporator on the under side and the other parts of the refrigerating apparatus on the upper side and packed separate from the main casing.

The evaporator illustrated includes a main refrigerant receiving vessel 12 which is illustrated as a cylindrical tank with its axis disposed slightly inclined from the horizontal. This vessel is mounted in the central one of three compartments 13, 14 and 15 formed by walls 16, 17, 18 and 19 depending from the top wall 11 in spaced substantially parallel relationship. The compartments have a bottom wall 20 and end walls 21 and 22. The two intermediate partitions 17 and 18 are shown as spaced slightly from the bottom wall so that all three compartments have restricted communication along the bottom, but this does not permit air circulation to any considerable extent between the compartments.

The main refrigerant vessel has two oppositely disposed branches extending into the two compartments 13 and 15. These are in the form of conduits 23 and 24 extending laterally from opposite sides of the vessel 12 at the bottom thereof and at the lower end. The two conduits extend laterally through the partitions 17 and 18 and thence lengthwise of the compartments 13 and 15. The lengthwise extending portions are slightly inclined in a direction opposite to that of the inclination of the vessel 12 and at their lower ends extend back through the partitions 17 and 18 and connect with a vertical conduit 25. At such connections there are comparatively small ports 26 so that unevaporated liquid in the branches 23 and 24 may slowly drain into said vertical conduit.

The conduit 25 at its upper end opens into the main vessel 12 above the middle of the latter and at its lower end it projects into a lower compartment or sump 27. The communication with the sump is by means of a comparatively small port 28. Projecting upwardly through the conduit 25 is an inner conduit 29 which has an open lower end at the bottom of the sump 27 and an open upper end in the upper portion of the main receiver or vessel 12. This upper portion may be enlarged to form a cup 30 into the bottom of which the conduit 29 extends, and surrounding this cup there is provided a second cup 31 annular in form. The upper edge of the inner cup 30 is higher than the outer edge of the cup 31 to permit flow from the cup 30 into the cup 31, but to prevent return flow. The cup 30 may be considered as merely the upper end of the conduit 29 and although preferably constituting an enlargement of said conduit, such enlargement might be intermediate of the ends of the conduit instead of at the top. The supply of liquid refrigerant to the evaporator and the return of refrigerant gas from the evaporator are by means of a conduit 32 which extends through the top wall 11 of the outside casing and through the top wall of the vessel 12. The inner end of this conduit terminates within the cup 31.

The operation of the parts so far described is as follows:

During the heating period of the still or still-absorber the refrigerant gas is delivered through a condenser and thence through the conduit 32 to the cup 31 from which it overflows into the vessel 12 and fills the latter and the branches 23 and 24 to the desired height. During the cooling period of the still or still-absorber the pressure in the evaporator is lowered to such a point that the liquid refrigerant in the evaporator may evaporate and the resulting gas return through the conduit 32. There will be comparatively little heat absorption by the liquid in the main vessel as it is protected in the compartment 14. The main heat absorption will be by the branches 23 and 24. The liquid refrigerant may flow into these branches and as it absorbs heat and evaporates, the gas will return to the main vessel from the same end of the branch as that through which the liquid entered, each branch being of sufficient diameter to permit such flow of liquid downwardly and gas upwardly at the same time. Any liquid which has not evaporated by the time it reaches the lower ends of the branches may slowly pass through the small ports 26 into the conduit 25 and thence through the small port 28 into the sump. Thus at the end of the evaporating period most of the water or other absorbent liquid which may have come over to the evaporator during the heating period will have accumulated in the sump. At the beginning of the next cooling period when the drop in pressure is comparatively rapid, the gas which has been trapped under pressure in the upper portion of the sump will expand and the liquid in the sump will be forced up the conduit 29 into the cup 30 and overflow into the cup 31. This flow will take place because of the fact that the passage from the sump through the conduit 29 is comparatively free and unobstructed, whereas the flow from the sump through the conduit 25 and branches 23 and 24 is restricted by the small ports 26 and 28. As the liquid overflows into the cup 31 it will be sucked out of the evaporator through the conduit 32 by reason of the lower pressure in the absorber or still-absorber. Thus during each cycle of operations the evaporator will be automatically purged of any accumulated water or high boiling point constituent. During the normal cooling period of the cycle there may be variations in pressure and temperature due to the opening of the doors of the main casing, or for other reasons, and as a result there may be some surging of liquid in the conduit 29. The cup or enlargement 30 is of such size that ordinarily this surging of liquid will not completely fill the cup and the liquid may return again through the conduit 29. Thus the delivery of liquid to the cup 31 and the suction of such liquid out of the evaporator after the initial operation of the cooling period will be prevented.

The branch conduit 23 serves primarily for air cooling. Within the compartment 13 this branch is provided with a series of comparatively thin plates or fins 33 of sheet metal and of a size approximating the dimensions of the compartment in a vertical plane. These plates may be welded or otherwise secured in heat interchanging relationship to the branch or conduit so that the heat absorbed by the plates or fins will be conducted to the conduit. The outer wall 16 has air ports 34 at the upper end and air ports 35 in the bottom wall 20. Thus the air which becomes warmed in the refrigerator and rises to the upper part thereof may enter the ports 34, become cooled by the plates or fins 33 and return to the main storage chamber through the ports 35. The bottom wall 20 is provided with a chamber or draft regulating plate 36 which has ports 37 which may be brought into or out of registry with the ports 35 by a sliding movement of the draft regulating plate 36. In this manner the rate of air flow may be regulated as desired. Preferably the bottom wall has upturned edges around each opening 35 so as to prevent the dripping of any water of condensation through these ports. All such water of condensation may be collected and drained off through a separate drain conduit. The plates or fins 33 are substantially parallel to the direction of flow of the air through the compartment 13 and thus do not materially interfere with or restrict such flow, but on the contrary they promote it because of the rapidity with which the air is cooled and the consequent promotion of the thermocyclic flow.

In a refrigerating system in which the evaporator forms a part, it is preferable to control the cycle of operations by the temperature of the air in the storage chamber.

I have shown the branch 23 as provided with an open ended vertically disposed tube 39 adjacent to the upper end thereof, and within this may be mounted a cell 40 of highly volatile liquid, the expansion or evaporation of which will cause the operation of the control means when the temperature in the refrigerator reaches a predetermined point. This cell is connected to the expansible member of the control apparatus by a conduit 41 extending through the top wall 11 of the refrigerator.

The other branch 24 in the compartment 15 is provided with a series of brackets or shelves 42 and 43 in superposed relationship and in heat conducting relationship to the branch or conduit. These serve to support pans or trays 44 in which water may be placed for the making of ice. As the compartment 15 does not have any air ports in the walls thereof, the thermocyclic air flow in the refrigerator will not come in contact with this water and therefore will not be subject to the same temperature variations that exist in the refrigerator and the water will not absorb odors from the food. Preferably the outside casing 10 has a separate door 45 whereby access may be had to the compartment 15 for the removal of the trays or the ice therein and without opening up the main chamber of the refrigerator. The two branches 23 and 24 in which the main evaporation of the refrigerant takes place being in separate compartments will operate independently and there will be comparatively little evaporation of the refrigerant in the conduit 24 after the water in the trays has been frozen, but this slowing down of the rate of evaporation will not affect the rate in the branch 23 nor the cooling of the air.

During the heating period when no evaporation takes place the ice will not be melted as it will be protected from the action of any rise in temperature of the air in the main body of the refrigerator.

The refrigerant liquid is intermittently delivered to the vessel 12, and when delivered is of a temperature not lower than that of the condenser water. As the vessel is protected from direct contact with the air circulating in the refrigerator, such air will not be heated up by the warm refrigerant liquid delivered to said vessel. Only a small portion of the liquid will be required to fill the conduit 23, and thus very little heat will be brought into the path of the circulating air during the heating period of the system.

Having thus described my invention, what I claim as new and desire to secure by Letters Patent is:

1. A refrigerator having a main storage space and two compartments in the upper part thereof, one of said compartments being open at the upper and lower ends thereof for air circulation therethrough, a conduit in the lower portion of said last mentioned compartment and extending lengthwise thereof and provided with heat absorbing fins, and a refrigerant receiver in the other compartment having connection with opposite ends of said conduit.

2. A refrigerator having a main storage space and two compartments in the upper part thereof, one of said compartments being open at the upper and lower ends thereof for air circulation therethrough, a conduit in the lower portion of said last mentioned compartment and extending lengthwise thereof and provided with heat absorbing fins, and a refrigerant receiver in the other compartment having open communication with one end of said conduit and restricted communication with the opposite end of said conduit.

3. A refrigerator having a main storage space and two compartments in the upper part thereof, a refrigerant receiving vessel in one of said compartments, and an inclined conduit in the other compartment, the upper end of said conduit being in open communication with the lower part of said vessel and the lower end of said conduit being in restricted communication with the upper part of said vessel.

4. A refrigerator having a main storage space, a refrigerant receiving vessel in the upper part thereof, an inclined conduit having the upper end in open communication with the lower part of said vessel, a sump in open communication with the upper part of said vessel and in restricted communication with the lower end of said conduit, and means for protecting said vessel from the thermocyclic circulation of air over said conduit.

5. A refrigerator having a main storage space, two compartments in the upper part thereof, one of said compartments having openings at the upper and lower parts thereof for the circulation of air therethrough, one of said openings having a draft regulator, a cooling conduit within said last mentioned compartment and provided with heat absorbing fins, and a refrigerant receiving vessel in the other of said compartments and having open communication with one end of said conduit and restricted communication with the opposite end thereof.

6. A refrigerator having a storage space, a compartment in the upper part thereof, a conduit extending lengthwise of said compartment, means secured to said conduit for supporting an ice making tray, and a refrigerant receiver outside of said compartment and having open communication with one end of said conduit and restricted communication with the opposite end and adapted to intermittently receive a supply of liquid refrigerant from an absorption refrigerating system.

7. A refrigerator having a storage space, a refrigerant receiver in the upper part thereof, a pair of conduits at opposite sides, each having one end in open communication with the lower part of said receiver and the opposite end in restricted communication with the upper part of said receiver and adapted to intermittently receive a supply of liquid refrigerant from an absorption refrigerating system, means for directing air current from said storage space over one of said conduits, and means for supporting ice making trays on the other of said conduits.

8. A refrigerator having a storage space, three compartments in the upper part thereof, a refrigerant receiver in the middle of said compartments, conduits in the two end compartments and each communicating with said receiver, and means for controlling the air circulation from said storage space through one of said end compartments, the other of said end compartments being substantially closed to such air circulation.

9. A refrigerator having a storage space, three compartments in the upper part thereof, a refrigerant receiver in the middle of said compartments, conduits in the two end compartments and each communicating with said receiver, and means for controlling the air circulation from said storage space through one of said end compartments, the other of said end compartments being substantially closed to such air circulation and having means secured to the conduit therein for supporting an ice making tray.

10. A refrigerator having a refrigerant receiver in the upper part thereof, a compartment at one side of said receiver, a conduit within said compartment and extending lengthwise thereof and communicating with said receiver, and a metal shelf clamped to said conduit.

11. An evaporator for refrigerating apparatus of the absorption type, including a refrigerant receiving vessel, a conduit extending along one side thereof and slightly inclined, the upper end of said conduit being connected to the lower end of said vessel, a drainage chamber having restricted communication with the lower end of said conduit, a conduit extending from the lower portion of said drainage chamber to the upper part of said vessel, a cup forming an enlargement of the upper end of said conduit, an annular cup encircling the upper end of said first mentioned cup and having its peripheral overflow edge below the upper edge of said first mentioned cup, and a refrigerant supply and return conduit terminating within said second mentioned cup.

12. An evaporator for refrigerating apparatus of the intermittently operating absorption type, including a refrigerant receiving vessel substantially cylindrical in form and disposed with its axis approximately horizontal, a conduit connected to the lower part of one end thereof, a drainage chamber below said vessel, a second conduit having restricted communication with said chamber and with said first conduit and having open communication with the upper part of said vessel, a third conduit extending from the lower part of said drainage chamber to the upper part of said vessel, said last mentioned conduit having an enlargement at the upper end and an annular cup encircling said enlargement, but below the top thereof, and a refrigerant supply and withdrawal conduit extending into said cup.

Signed at Brooklyn in the county of Kings and State of New York this twelfth day of January, A. D. 1928.

LAWRENCE BRUEHL.